(12) United States Patent
Yuan et al.

(10) Patent No.: US 9,948,369 B2
(45) Date of Patent: Apr. 17, 2018

(54) METHOD AND APPARATUS FOR IMPLEMENTING TRANSPARENT MULTI-USER MULTIPLE-INPUT MULTIPLE-OUTPUT TRANSMISSION

(71) Applicant: ZTE Corporation, Shenzhen (CN)

(72) Inventors: Wenchong Yuan, Shenzhen (CN); Dameng Ren, Shenzhen (CN); Fengjuan Wu, Shenzhen (CN); Jie Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/300,811

(22) PCT Filed: Aug. 29, 2014

(86) PCT No.: PCT/CN2014/085575
§ 371 (c)(1),
(2) Date: Nov. 3, 2016

(87) PCT Pub. No.: WO2015/149477
PCT Pub. Date: Oct. 8, 2015

(65) Prior Publication Data
US 2017/0272134 A1    Sep. 21, 2017

(30) Foreign Application Priority Data
Apr. 2, 2014 (CN) .......................... 2014 1 0132415

(51) Int. Cl.
*H04B 7/0452* (2017.01)
*H04B 7/06* (2006.01)
*H04W 52/32* (2009.01)

(52) U.S. Cl.
CPC ......... *H04B 7/0452* (2013.01); *H04B 7/0617* (2013.01); *H04W 52/325* (2013.01)

(58) Field of Classification Search
USPC .................................. 370/329, 328; 455/522
See application file for complete search history.

(56) References Cited

U.S. PATENT DOCUMENTS 8,797,950 B2 * 8/2014 Chen .................... H04L 5/0023
                                                        370/328
2012/0207119 A1    8/2012 Zhang
(Continued)

FOREIGN PATENT DOCUMENTS

| CN | 101374007 A | 2/2009 |
| CN | 101388703 A | 3/2009 |

(Continued)

OTHER PUBLICATIONS

International Search Report in international application No. PCT/CN2014/085575, dated Jan. 12, 2015.
(Continued)

*Primary Examiner* — Eva Puente
(74) *Attorney, Agent, or Firm* — Oppedahl Patent Law Firm LLC

(57) ABSTRACT

Disclosed are a method and apparatus for implementing transparent multi-user multiple-input multiple-output (MU-MIMO) transmission. The method comprises: pairing at least two user equipments (UEs) according to channel estimation matrices of the UEs; configuring power of a demodulation reference signal (DMRS) of each paired UE, and configuring power of data (DATA) of each paired UE; and jointly generating a beamforming weight W according to the channel estimation matrix of each paired UE, and performing beamforming according to the power of the DMRS, the power of the DATA and the beamforming weight W, so as to generate a signal to be sent.

12 Claims, 4 Drawing Sheets

(56) References Cited

U.S. PATENT DOCUMENTS

| | | | | |
|---|---|---|---|---|
| 2012/0238310 | A1* | 9/2012 | Xiao | H04W 52/24 |
| | | | | 455/522 |
| 2014/0029522 | A1 | 1/2014 | Farmanbar | |
| 2014/0269519 | A1* | 9/2014 | Shan | H04L 5/0051 |
| | | | | 370/329 |
| 2014/0369220 | A1 | 12/2014 | Fan | |
| 2015/0092722 | A1 | 4/2015 | Sharp | |
| 2015/0139151 | A1* | 5/2015 | Seo | H04J 13/18 |
| | | | | 370/329 |
| 2015/0263796 | A1* | 9/2015 | Nam | H04B 7/0417 |
| | | | | 370/329 |
| 2016/0315748 | A1* | 10/2016 | Chen | H04L 5/0051 |

FOREIGN PATENT DOCUMENTS

| | | |
|---|---|---|
| CN | 101854668 A | 10/2010 |
| CN | 102076076 A | 5/2011 |
| CN | 102104404 A | 6/2011 |
| WO | 2011062066 A1 | 5/2011 |
| WO | 2013091148 A1 | 6/2013 |
| WO | 2013151277 A1 | 10/2013 |

OTHER PUBLICATIONS

English Translation of the Written Opinion of the International Search Authority in international application No. PCT/CN2014/085575, dated Jan. 12, 2015.

"Views on MU-MIMO transparency" R1-100305, 3GPP TSG-RAN WG1 Meeting #59bis Valencia, Spain, Jan. 18-22, 2010.

Supplementary European Search Report in European application No. 14888383.8, dated Feb. 23, 2017.

3rd Generation Partnership Project; Technical Specification Group Radio Access Network; Evolved Universal Terrestrial Radio Access (E-UTRA); Physical Channels and Modulation(Release 10) 3GPP TS 36.211 V10.4.0 (Dec. 2011).

* cited by examiner

METHOD AND APPARATUS FOR IMPLEMENTING TRANSPARENT MULTI-USER MULTIPLE-INPUT MULTIPLE-OUTPUT TRANSMISSION

TECHNICAL FIELD

The disclosure relates to the technical field of Multi-User Multiple-Input Multiple-Output (MU-MIMO), and in particular to a method and device for implementing transparent MU-MIMO transmission.

BACKGROUND

In a process of implementing the technical solutions of the embodiments of the disclosure, the inventor of the disclosure at least finds the following technical problems in the prior arts.

A Multiple-Input Multiple-Output (MIMO) technology is a technology disclosed by the Bell Laboratory at the end of the last century for a multi-antenna communication system, and specifically, multiple antennae (or array antennae) and multiple channels are adopted at both a transmitter and a receiver to effectively suppress channel fading. In addition, compared with a conventional single-antenna communication system, a multi-antenna communication system adopting MIMO may increase system capacity manyfold, and may also improve channel reliability and lower an error bit rate.

An MIMO technology is divided into Single-User MIMO (SU-MIMO) and MU-MIMO), and as shown in FIG. 1, SU-MIMO refers to that there is only one piece of User Equipment (UE) on the same time-frequency resource, while MU-MIMO refers to that multiple pieces of UE occupy the same time-frequency resource. The maximum number of data streams which may be transmitted in an MIMO system may not exceed a rank of a channel estimation matrix, so that the number of UE (i.e. the number of UE which may be paired) in an MU-MIMO system is determined by the number of antennae of a NodeB side, and the total number of antennae of all the UE is required to be smaller than or equal to the number of the antenna of the NodeB side. Common-Channel Interference (CCI) between channels is eliminated by virtue of a precoding technology, so that spectrum resources are saved, and system throughput is greatly increased.

An MIMO technology is a technology mainly applied to a physical layer of a Long Term Evolution (LTE) system. A conventional LTE system mainly adopts 8 antenna ports at the NodeB side and applies to a transmission scenario of maximally supported 8 data streams mapped from two code words supported by a service channel of a Physical Downlink Shared Channel (PDSCH). An ordinary structure of a downlink physical channel is shown in FIG. 2, code words (at most two) transmitted by an upper Media Access Control (MAC) layer of a physical layer are scrambled and modulated to generate complex modulated symbols respectively, and then layer mapping is performed, through antenna ports with a mapping capability, on the complex modulated symbols generated by each code word to generate multiple layers of data streams; precoding and resource mapping are performed on each of the multiple layers of data streams; and Orthogonal Frequency Division Multiplexing (OFDM) signals are finally generated on respective antenna ports, and mapped to the corresponding antenna ports. Here, due to limited number of the code words, two pieces of UE may be paired during MU-MIMO of the LTE system.

An LTE system of Earlier Release 8 (R8) has referred to a space division multiplexing technology for multiple layers of data streams on a PDSCH, an MU-MIMO form may be supported, and Downlink Control Information (DCI) is DCI format 1D.

An LTE system of Release 9 (R9) defines transmission mode 7 (single-stream beamforming) and transmission mode 8 (multi-stream beamforming), and such two beamforming-based transmission modes under a Time Division Duplexing (TDD) mode estimate channels by virtue of DeModulation Reference Signals (DMRSs) and then perform data demodulation in an equalization manner. DCI is DCI format 2A and DCI format 1D or 2B respectively. At this moment, MU-MIMO becomes more flexible in the system, and multiple pieces of UE may identify own corresponding channels through different DMRS sequences, thereby implementing accurate channel estimation.

An LTE system of later Release 10 (R10) defines new transmission mode 9, and more DMRS ports (as many as 8 DMRS ports) are involved, so that a single piece of UE may maximally identify 8 layers of data streams. Its DCI is DCI format 2C.

As mentioned above, under the limitation of a 3rd Generation Partnership Project (3GPP) protocol, transmission mode 8 may only support a scenario where at most two pieces of UE are paired and each piece of paired UE may identify a single layer of data stream, transmission mode 9 may only support a scenario where a single piece of UE may identify at most 8 layers of data streams, and along with increase of the number of data streams, the number of DMRS ports required to be supported correspondingly increases, and the number of data Resource Elements (REs) correspondingly decreases.

Therefore, in a conventional LTE system, each cell theoretically supports data sending of only two pieces of UE on the same time-frequency resource, that is, pairing of only two pieces of UE is supported, and it is impossible to pair at least two pieces of UE on the premise of not changing any receiving flow.

SUMMARY

In order to solve the existing problem, the embodiments of the disclosure are intended to provide a method and device for implementing transparent MU-MIMO transmission, which may implement pairing of at least two pieces of UE on the premise of not changing any receiving flow.

The technical solutions of the embodiment of the disclosure are implemented as follows.

An embodiment of the disclosure provides a method for implementing transparent MU-MIMO transmission, which may include that: at least two pieces of UE are paired according to channel estimation matrices of UE, power of DMRSs of each piece of paired UE is configured, and power of data of each piece of paired UE is configured; and a beamforming weight is jointly generated according to the channel estimation matrix of each piece of paired UE, and beamforming is performed according to the power of the DMRSs, the power of the data and the beamforming weight to generate a signal to be sent.

In an embodiment, the step that the power of the DMRSs of each piece of paired UE is configured may include that: total power of each RE occupied by the DMRSs is determined according to power of each RE occupied by a Cell Reference Signal (CRS), and power of DMRSs that are allocated to each piece of paired UE is further determined according to a pilot reconfiguration factor.

In an embodiment, the step that the power of the data of each piece of paired UE is configured may include that: total power of each RE occupied by the data is determined according to the power of each RE occupied by the CRS, and power of the data that is allocated to each piece of paired UE is further determined according to a data reconfiguration factor.

In an embodiment, the step that the beamforming weight is jointly generated according to the channel estimation matrix of each piece of paired UE may further include that: a corrected beamforming weight is obtained according to the beamforming weight; and herein, beamforming is performed according to the power of the DMRSs, the power of the data and the corrected beamforming weight to generate the signal to be sent.

In an embodiment, the step that the corrected beamforming weight is obtained according to the beamforming weight may include that: the beamforming weight is normalized to obtain the corrected beamforming weight.

In an embodiment, the step that the corrected beamforming weight is obtained according to the beamforming weight may include that: the beamforming weight is linearly scaled by virtue of a linear factor to obtain the corrected beamforming weight.

Another embodiment of the disclosure further provides a device for implementing transparent MU-MIMO transmission, which may include: a channel estimation module and a beamforming module, wherein the channel estimation module may be configured to pair at least two pieces of UE according to channel estimation matrices of UE, configure power of DMRSs of each piece of paired UE, and configure power of data of each piece of paired UE; and the beamforming module may be configured to jointly generate a beamforming weight according to a channel estimation matrix of each piece of paired UE, and perform beamforming according to the power of the DMRSs, the power of the data and the beamforming weight to generate a signal to be sent.

In an embodiment, the channel estimation module may include: a pairing sub-module and a power configuration sub-module, wherein the pairing sub-module may be configured to pair the at least two pieces of UE according to the channel estimation matrices of the UE; and the power configuration sub-module may be configured to determine total power of each RE occupied by the DMRSs according to power of each RE occupied by a CRS, and further determine power of DMRSs that are allocated to each piece of paired UE according to a pilot reconfiguration factor.

In an embodiment, the power configuration sub-module may be configured to determine total power of each RE occupied by the data according to the power of each RE occupied by the CRS, and further determine power of data that is allocated to each piece of paired UE according to a data reconfiguration factor.

In an embodiment, the beamforming module may further be configured to calculate a corrected beamforming weight according to the beamforming weight, and perform beamforming according to the power of the DMRSs, the power of the data and the corrected beamforming weight to generate the signal to be sent.

In an embodiment, the beamforming module may further be configured to normalize the beamforming weight to obtain the corrected beamforming weight.

In an embodiment, the beamforming module may further be configured to linearly scale the beamforming weight by virtue of a linear factor to obtain the corrected beamforming weight.

The channel estimation module, the beamforming module, the pairing sub-module and the power configuration sub-module may be implemented by a Central Processing Unit (CPU), a Digital Signal Processor (DSP) or a Field-Programmable Gate Array (FPGA) when executing processing.

Obviously, according to the method and device for implementing transparent MU-MIMO transmission in the embodiment of the disclosure, the at least two pieces of UE are paired according to the channel estimation matrices of the UE, the power of the DMRSs of each piece of paired UE is configured, and the power of the data of each piece of paired UE is configured; and the beamforming weight is jointly generated according to the channel estimation matrix of each piece of paired UE, and beamforming is performed to generate the signal to be sent according to the power of the DMRSs, the power of the data and the beamforming weight, so that streaming data of multiple layers corresponding to multiple code words may be simultaneously sent to multiple pieces of paired UE in a transparent manner by optimizing a system structure and precoding method of a NodeB side on the premise of not changing protocols, not changing signalling flows and not changing receiving and demodulation flows of the UE, system throughput is obviously increased and decreased, and a system spectrum resource utilization rate is increased.

DETAILED DESCRIPTION

In the embodiment of the disclosure, at least two pieces of UE are paired according to channel estimation matrices of UE; power of DMRSs of each piece of paired UE is configured, power of data of each piece of paired UE is configured, a beamforming weight is jointly generated according to the channel estimation matrix of each piece of paired UE, and beamforming is performed according to the power of the DMRSs, the power of the data and the beamforming weight to generate a signal to be sent.

Before the embodiment of the disclosure is described, definition about transparent MU-MIMO is elaborated at first, specifically as follows.

For any piece of UE participating in MU-MIMO cooperative transmission, there is no difference between SU-MIMO and MU-MIMO transmission, and the UE is called the ith UE below. The ith UE only knows own DMRS port information such as own occupied port number and specific occupied ports during PDSCH reception; and the ith UE does not know DMRS port information of its paired UE. For example, UE1, UE2 and UE3 are scheduled on the same Resource Block (RB), and the three pieces of UE form a cooperative transmission group, wherein UE2 and UE3 are paired UE of UE1, and during transparent MU-MIMO transmission, UE1 may not obtain DMRS port information of UE2 and UE3; and correspondingly, non-transparent MU-MIMO refers to that any one in a group of UE participating in MU-MIMO cooperative transmission may obtain DMRS port information of its paired UE.

The transmission method of the embodiment of the disclosure is based on transparent MU-MIMO, so that there are no limits made to the number of paired UE when the UE is paired, and a system may set and determine the number of the paired UE according to a requirement.

The disclosure will be further described below with reference to the drawings and specific embodiments in detail.

Embodiment 1

Figure 1:
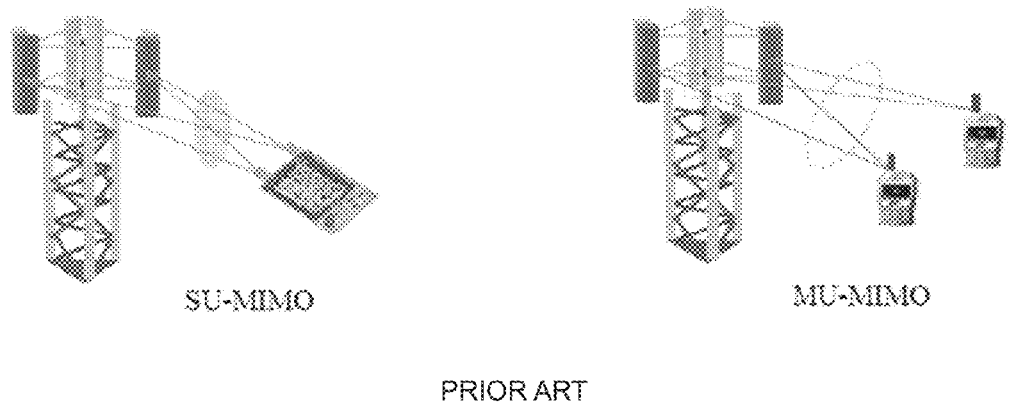
FIG. 1 is an MIMO diagram of SU-MIMO and MU-MIMO in an LTE system.
Figure 2:
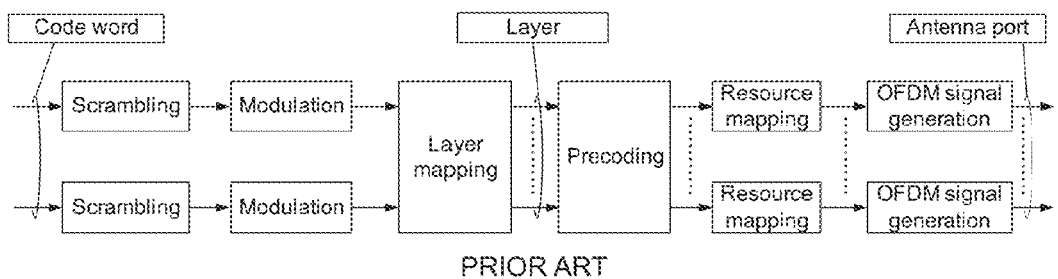
FIG. 2 is an ordinary structure of a downlink physical channel of a system.
Figure 3:
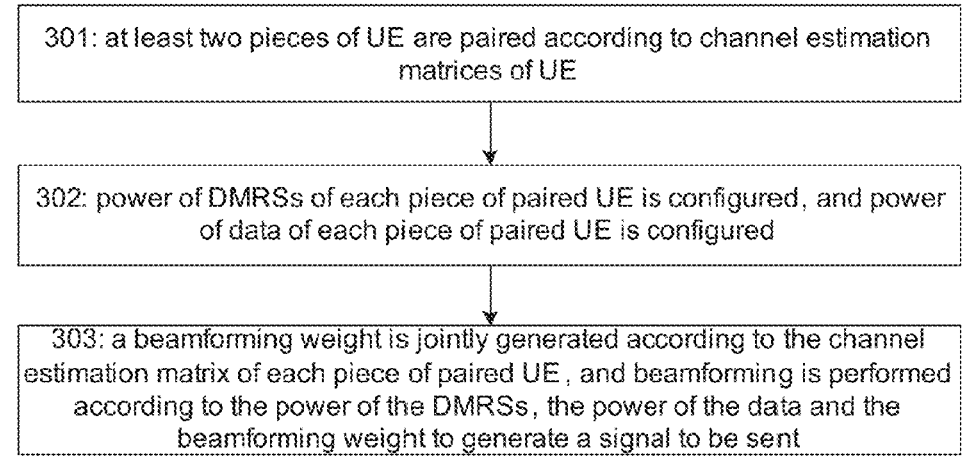
FIG. 3 is a flowchart of a method for implementing transparent MU-MIMO transmission according to embodiment 1 of the disclosure.

A method for implementing transparent MU-MIMO transmission in embodiment 1 of the disclosure is shown in FIG. 3, and a specific flow includes the following steps.

Step 301: at least two pieces of UE are paired according to channel estimation matrices of UE.

Specifically, in a TDD-LTE system with K antennae on a NodeB side, the NodeB side performs joint estimation according to the channel estimation matrices of all the UE, selects M pieces of UE which may be paired according to a scheduling strategy or a pairing algorithm, and pairs the M pieces of UE, wherein a value of M is more than or equal to 2.

Before pairing, the channel estimation matrix of each piece of UE is acquired by virtue of channel reciprocity, and here, the UE is all UE within coverage of a cell.

Here, the scheduling strategy or pairing algorithm configured to select the UE which may be paired may be set according to different design solutions, and there are no limits made to adoption of the scheduling strategy and the pairing algorithm in the embodiment of the disclosure.

Step 302: power of DMRSs of each piece of paired UE is configured, and power of data of each piece of paired UE is configured.

Specifically, after the at least two pieces of paired UE are determined, for each piece of paired UE, the NodeB side allocates two code words to each piece of paired UE, and performs layer mapping to map generated complex modulated signals to multiple layers of data streams according to a transmission mode of a system, wherein the transmission mode mentioned here may be transmission mode 7, transmission mode 8 and transmission mode 9; different transmission modes correspond to different DCI formats, DCI including: uplink and downlink scheduling information and uplink scheduling control information, wherein transmission mode 7 is a single-stream beamforming mode, a corresponding antenna port is port 5, and DCI is DCI format 2A; transmission mode 8 is a dual-stream beamforming mode, corresponding antenna ports are port 7 and port 8, and DCI is DCI format 2B; transmission mode 9 is an additional mode in Long Term Evolution-Advanced (LTE-A), and may support transmission of maximally 8 layers of data streams, corresponding antenna ports are port 7 to port 14, and DCI is DCI format 2C; and here, the numbers of layers of data streams, configured to transmit data, of each piece of paired UE are the same, and are defined to be N.

In a layer mapping process, when N layers of data streams corresponding to each code word of each piece of paired UE are determined, it is also necessary to determine DMRS power and data power of each layer of data stream, wherein, in transmission mode 7 or transmission mode 8, two code words are allocated to each piece of paired UE, and each code word is mapped into a single layer of data stream; and in transmission mode 9, two code words are allocated to each piece of paired UE, and each code word is mapped into multiple layers, at most 4 layers, of data streams according to channel quality.

According to a definition of a 3GPP protocol, power of each RE occupied by a CRS is $P_{CRS}$, total power of each RE occupied by DMRSs is $P_{DMRS}$, and total power of each RE occupied by data is $P_{DATA}$, wherein $P_{DMRS}=\alpha P_{CRS}$, and $P_{DATA}=\beta P_{CRS}$; and $\alpha$ and $\beta$ are a power configuration factor of the DMRSs and a power configuration factor of the data respectively, and under a normal condition, $\alpha=\beta=1$.

When each RE has multiple layers of DMRSs or multiple layers of data, power of DMRSs and power of data of each layer of each piece of paired UE are reconfigured, and under the condition that each RE has multiple layers of DMRSs or multiple layers of data, the DMRS power of each piece of paired UE is defined to be $P_{Port}$ and the data power is defined to be $P_{data}$, wherein $$P_{Port}=\chi P_{DMRS}, P_{data}=\delta P_{DATA},$$

$\chi$ and $\delta$ are a pilot reconfiguration factor and data reconfiguration factor under the condition that each RE has multiple layers of DMRSs or multiple layers of data respectively, and here $$\delta = \frac{1}{MN} \text{ and } \chi = \begin{cases} \frac{1}{MN}, N \le 2 \\ \frac{2}{MN}, \text{else} \end{cases}.$$

After related information of the DMRSs of each piece of paired UE is determined according to the transmission mode, a pilot scrambling identifier $n_{SCID}$ is allocated to each piece of paired UE, wherein, in an existing protocol, MU-MIMO of two pieces of paired UE is supported only, and the number of $n_{SCID}$ which may be allocated is 2, while in the embodiment of the disclosure, when the number M of the paired UE is more than or equal to 2, the same $n_{SCID}$ is allocated to M/2 pieces of paired UE, wherein pilot scrambling sequences corresponding to each DMRS may be calculated according to $n_{SCID}$ according to the definition of the 3GPP protocol, thereby determining the DMRSs corresponding to $n_{SCID}$; here, the same $n_{SCID}$ may be allocated to the M/2 pieces of paired UE under the condition that a value of $n_{SCID}$ may only adopt 0 or 1 and $n_{SCID}$ is uniformly allocated, which may facilitate processing of the system; however, in the embodiment of the disclosure, there are no limits made to a specific allocation solution for $n_{SCID}$, different $n_{SCID}$ may also be allocated to different numbers of paired UE according to values of $n_{SCID}$; and for example, when the values of $n_{SCID}$ are 0, 1, 2 and 3, allocating different $n_{SCID}$ to the same number of paired UE is implemented as follows: 0 is configured to M/4 pieces of UE, 1 is configured to M/4 pieces of UE, 2 is configured to M/4 pieces of UE and 3 is configured to M/4 pieces of UE. In addition, a specific process of calculating the pilot scrambling sequences according to $n_{SCID}$ and further calculating the DMRSs in the embodiment of the disclosure is a conventional art, and will not be elaborated herein.

During a practical application, different pilot scrambling sequences are generated for each piece of paired UE according to $n_{SCID}$ to distinguish different DMRSs, thereby distinguishing different paired UE.

During a practical application, the NodeB side pairs multiple pieces of UE according to a pairing criterion, and then simultaneously configures multiple corresponding code words to the multiple pieces of UE, each code word being mapped to multiple layers of streaming data according to channel conditions. Compared with an existing protocol where the number of code words is limited to be two, the method of the embodiment of the disclosure may greatly increase the number of code words configured by the NodeB side and further obviously increase system throughput.

Step 303: a beamforming weight is jointly generated according to the channel estimation matrix of each piece of paired UE, and beamforming is performed according to the power of the DMRSs, the power of the data and the beamforming weight to generate a signal to be sent.

Specifically, a channel estimation matrix H of the whole system is jointly constructed by channel estimation matrix $H_j$ of paired $UE_j$, and an MU-MIMO precoding algorithm weight W of the channel estimation matrix H' of the whole system is further calculated, wherein $H_i$ is a channel estimation matrix of the ith paired UE, an inverse matrix or pseudo-inverse matrix of H may be determined as the beamforming weight W by adopting a Zero-Forcing (ZF) algorithm, the precoding algorithm weight W may also be calculated by adopting a Minimum Mean Square Error (MMSE) algorithm or some other existing precoding algorithms such as Singular Value Decomposition (SVD) and Max-Signal-to-Leakage-and-Noise Ratio (Max-SLNR), and there are no limits made to a specific method for calculating the precoding algorithm weight W in the embodiment of the disclosure; and here, the precoding algorithm weight W is the beamforming weight.

After the beamforming weight W is obtained, precoding operation may be performed on the DMRSs and data of the paired UE according to W, and signals of an antenna domain are converted into signals of a beam domain for processing to implement beamforming.

In the embodiment of the disclosure, the beamforming weight may adopt the precoding algorithm weight W, and may also adopt a corrected precoding algorithm weight W', i.e. a corrected beamforming weight W'.

Under a multi-antenna condition of the NodeB side, W is applied to the multi-antenna condition, and after the beamforming weight W is generated, power correction is performed on W to obtain the corrected precoding algorithm weight W' to eliminate interference between each piece of paired UE, wherein the following two methods may be adopted for correcting W.

Method 1: normalization: the beamforming weight is normalized to obtain the corrected beamforming weight;

unified normalization is performed on power of each element of a precoding matrix by virtue of a formula, the formula being specifically:

$$W' = \frac{W}{\sum\limits_{k=1,l=1}^{k=K,l=L} W^{k,l}} = \frac{W}{\|W\|^2},$$

where $W^{k,l}$ is a parameter corresponding to the kth row and first column of matrix W; K is the number of antennae of the NodeB side; and L=MN, and is the total number of data receiving antennae of all the paired UE, M is the number of the paired UE, and N is the number of the layers of the data streams of the paired UE.

Method 2: linear scaling: the beamforming weight is linearly scaled by virtue of a linear factor $$\frac{1}{\sqrt{MN}}$$

to obtain the corrected beamforming weight; and the power of each element of the precoding matrix is linearly scaled according to the total number of the data receiving antennae of all the paired UE, specifically:

$$W' = \frac{W}{\sqrt{MN}}.$$

A specific precoding process is as follows.

For an MIMO system with M (M>1) pieces of UE, it is set that the number of sending antennae of a NodeB side is $N_t$ and the number of antennae of target $UE_j$ is $N_{j,r}$, $N_t > N_{j,r}$. $x_j$ is data information of target $UE_j$ and matrix $W_j$ is a beamforming value of target $UE_j$.

At a receiver, a received signal of $UE_j$ may be represented as:

$$y_j = U_j W_j x_j + \sum_{k=1,k \neq j}^{K} U_j W_k x_k + n_j,$$

where $n_j$ is defined to be Gaussian white noise of $UE_j$, $U_j \in C^{N_{j,r} \times N_t}$ is a channel space response matrix of target $UE_j$, and y is a receiving side.

After conversion of the signals of the antenna domain to the beam domain is implemented by the abovementioned process, pilots and data sent to the multiple pieces of UE on each layer of data streams are accumulated on the same time-frequency resource to generate data to be sent for simultaneous sending.

During a practical application, during reception of the UE, it is only necessary to analyze the corresponding data streams of 1, 2, . . . 8 layers according to DCI format 2A, 2B and 2C. Each layer of data stream corresponds to a DMRS as a channel estimation pilot. For example, in the method of embodiment 1 of the disclosure, the paired UE may normally identify the transmission mode and the configured DMRSs according to an SU-MIMO mode by virtue of the DCI in an existing protocol release, or the UE identifies a new transmission mode and different indicated DMRSs in a new protocol release.

Relative to a precoding algorithm in the conventional art, the embodiment of the disclosure optimizes the precoding algorithm and reallocates the power of multiple layers of data streams, thereby well solving the problem of power overflow probably caused by multiple data streams, protecting various intrinsic attributes (such as orthogonality) of the precoding matrix and also increasing a utilization rate of spectrum resources.

In addition, in a Massive MIMO scenario, a massive antenna array of Massive MIMO may flexibly call multiple groups of paired UE, so that the method of the embodiment of the disclosure has an obvious gain. Moreover, the precoding matrix generation method of the embodiment of the disclosure is also applicable to precoding matrix generation of non-data channels such as an Enhanced Physical Downlink Control Channel (ePDCCH) or pilots in a future LTE-A release.

Embodiment 2

In embodiment 2 of the disclosure, a method for implementing transparent MU-MIMO transmission in embodiment 1 of the disclosure is elaborated with the condition that the number of array antennae of a NodeB side of an LTE system is 64, each mobile terminal in a cell covered by the NodeB has two receiving antennae and R9 and higher release of a 3GPP LTE protocol are supported as an example.

Figure 4:
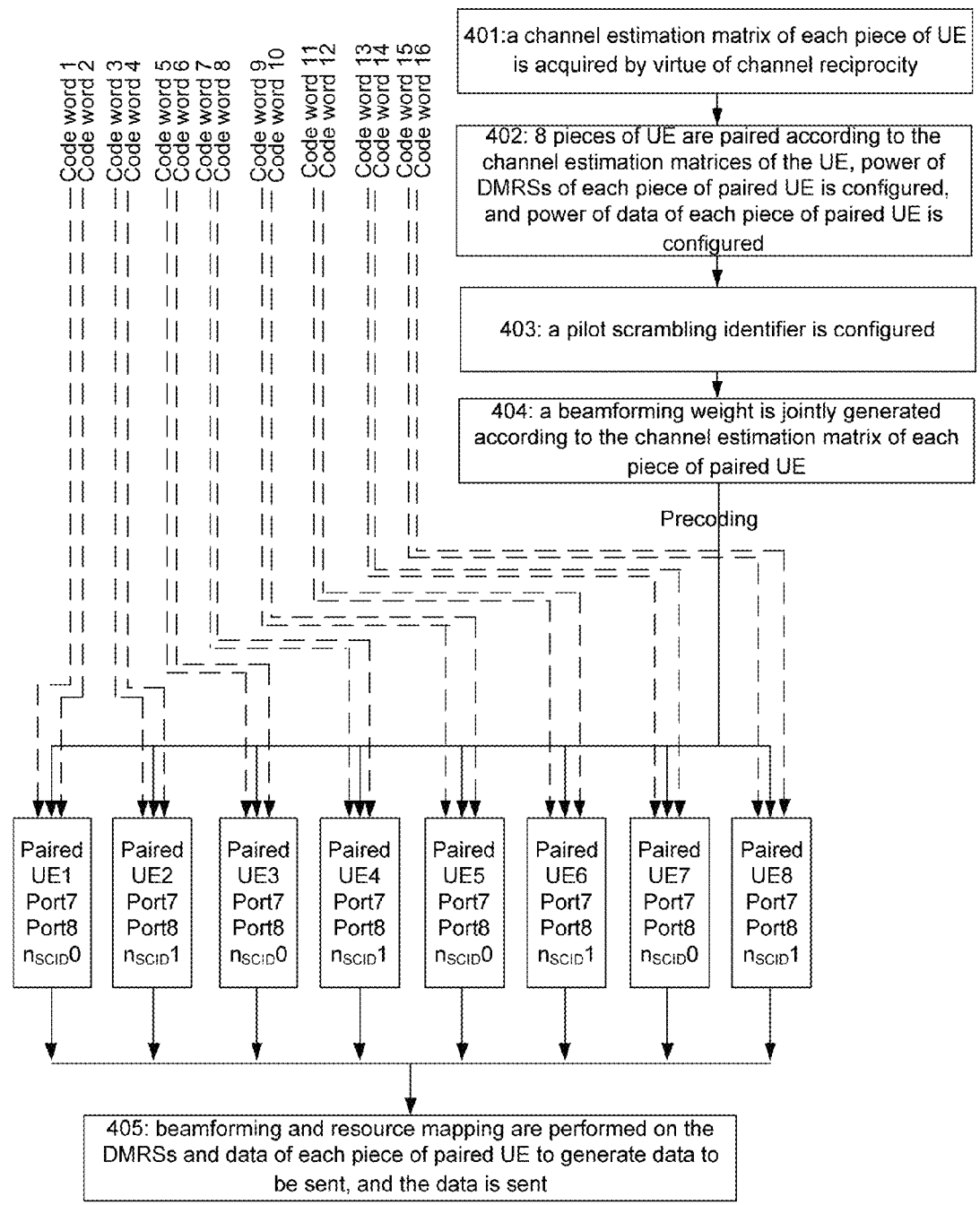
FIG. 4 is a flowchart of a method for implementing transparent MU-MIMO transmission according to embodiment 2 of the disclosure.

As shown in FIG. 4, the method includes the following steps.

Step 401: a channel estimation matrix of each piece of UE is acquired by virtue of channel reciprocity.

Here, in a TDD-LTE system, a NodeB side acquires the channel estimation matrix of each piece of UE by virtue of the channel reciprocity, wherein the acquired channel estimation matrix include channel estimation matrix $H_j$ of each piece of UE obtained by performing channel estimation on $SRS_j$ sent by all the UE by the NodeB, wherein j represents the jth UE.

Step 402: 8 pieces of UE are paired according to the channel estimation matrices of the UE, power of DMRSs of each piece of paired UE is configured, and power of data of each piece of paired UE is configured.

Here, the NodeB side evaluates channel quality of all the UE according to the channel estimation matrices of all the UE, selects and pairs the 8 pieces of UE suitable to be paired (the 8 pieces of UE all support transmission mode 8) according to a multi-UE pairing criterion, and correspondingly configures two sets of code words to each piece of paired UE, specifically as follows: code word 1 and code word 2 are configured to paired UE1, code word 3 and code word 4 are configured to paired UE2, and by parity of reasoning, code words 15 and 16 are configured to paired UE8.

When each piece of paired UE adopts DMRS port 7 and port 8 for space division, that is, under the condition of transmission mode 8, each piece of UE generates two code words, and each code word is mapped to a layer of data stream, wherein values of a pilot reconfiguration factor $\chi$ and a data reconfiguration factor $\delta$ are shown in Table 1.

TABLE 1

| Reconfiguration factor | Value |
| --- | --- |
| $\delta$ | ½M |
| $\chi$ | ½M |

Step 403: a pilot scrambling identifier is configured.

Here, a DCI format is DCI format 2B, the DMRSs of each piece of paired UE are at the same positions and in port 7 and port 8, and different pilot scrambling sequences are generated between each piece of paired UE to distinguish their DMRSs according to $n_{SCID}$, allocation conditions being as follows:

a: $n_{SCID}=0$ is allocated to M/2 pieces of UE, the M/2 pieces of UE being: paired UE1, paired UE3, paired UE5 and paired UE7; and b: $n_{SCID}=1$ is allocated to M/2 pieces of UE, the M/2 pieces of UE being: paired UE2, paired UE4, paired UE6 and paired UE8.

Step 404: a beamforming weight is jointly generated according to the channel estimation matrix of each piece of paired UE.

Specifically, a channel estimation matrix of the whole system is jointly constructed by the channel estimation matrices of the paired UE. An MU-MIMO precoding algorithm weight W of the channel estimation matrix of the whole system is calculated, wherein an inverse or pseudo-inverse matrix of the channel estimation matrix may be calculated as the beamforming weight by adopting a ZF algorithm:

$$W=H^+=H^H(HH^H)^{-1}.$$

Step 405: beamforming and resource mapping are performed on the DMRSs and data of each piece of paired UE to generate data to be sent, and the data is sent.

Specifically, after the beamforming weight W is obtained, precoding operation may be performed on the DMRSs and data of the paired UE according to W, signals of an antenna domain are converted into signals of a beam domain for processing to implement beamforming, and pilots and data sent to multiple pieces of UE on each layer of data stream are accumulated on the same time-frequency resource to generate the data to be sent for simultaneous sending.

Embodiment 3

In embodiment 3 of the disclosure, a method for implementing transparent MU-MIMO transmission in embodiment 1 of the disclosure is elaborated with the condition that the number of array antennae of a NodeB side of an LTE system is 256, each mobile terminal in a cell covered by the NodeB has two receiving antennae and R10 and higher release of a 3GPP LTE protocol are supported as an example.

Figure 5:
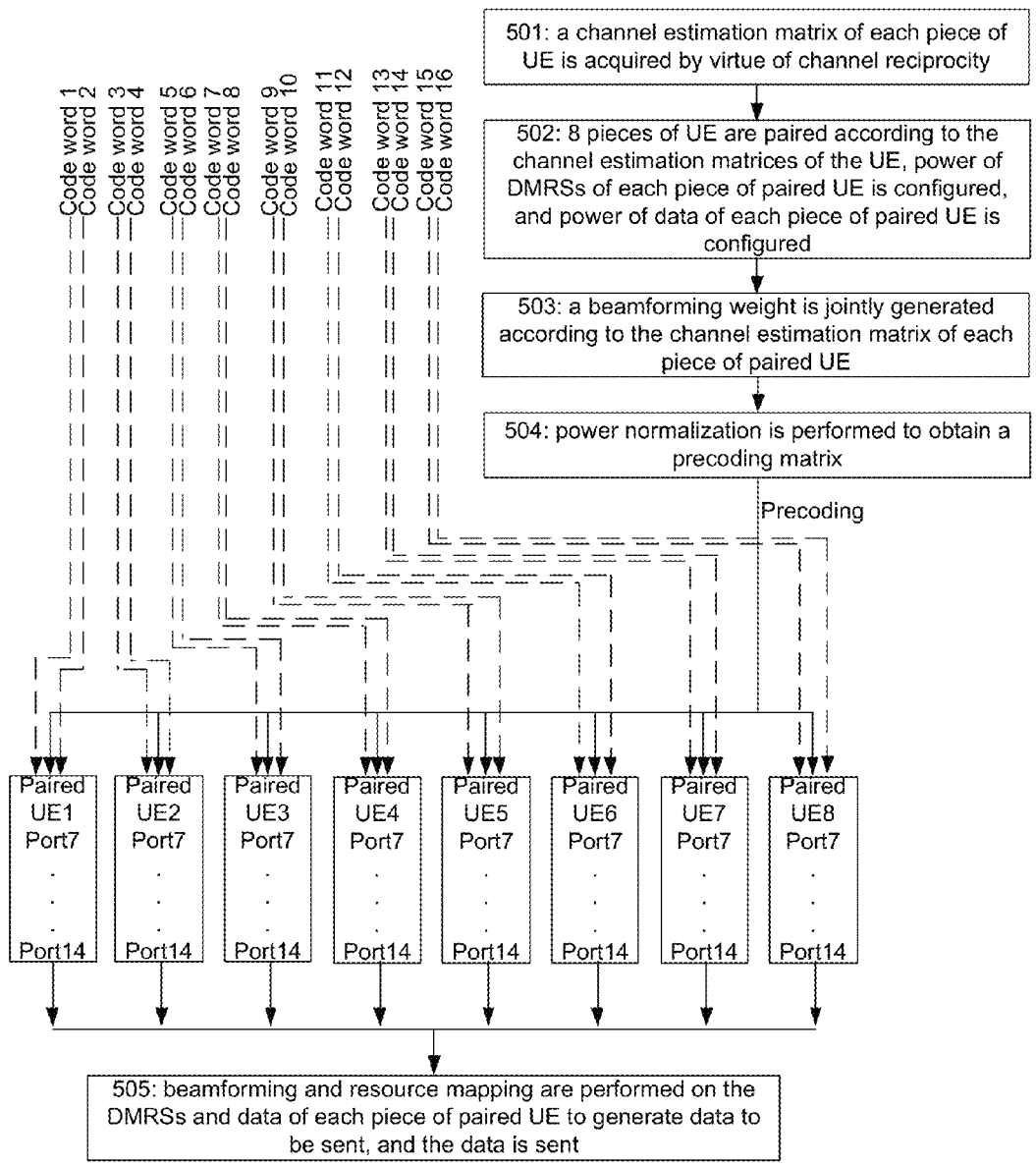
FIG. 5 is a flowchart of a method for implementing transparent MU-MIMO transmission according to embodiment 3 of the disclosure.

As shown in FIG. 5, the method includes the following steps.

Step 501: a channel estimation matrix of each piece of UE is acquired by virtue of channel reciprocity.

Here, in a TDD-LTE system, a NodeB side acquires the channel estimation matrix of each piece of UE by virtue of the channel reciprocity, wherein the acquired channel estimation matrix includes channel estimation matrix $H_j$ of each piece of UE obtained by performing channel estimation on $SRS_j$ sent by all the UE by the NodeB, wherein j represents the jth UE.

Step 502: 8 pieces of UE are paired according to the channel estimation matrices of the UE, power of DMRSs of each piece of paired UE is configured, and power of data of each piece of paired UE is configured.

Here, the NodeB side evaluates channel quality of all the UE according to the channel estimation matrices of all the UE, selects and pairs the 8 pieces of UE suitable to be paired (the 8 pieces of UE all support transmission mode 9) according to a multi-UE pairing criterion, and correspondingly configures two sets of code words to each piece of paired UE; and when each piece of paired UE adopts DMRS port 7, port 8 and port 9 to port 14 for space division, that is, under the condition of transmission mode 9, each piece of UE generates two code words, and each code word is mapped to multiple layers of data streams according to the channel quality, wherein the number of the layers of the mapped data streams is maximally 4.

At this moment, a DCI format is DCI format 2C, and the DMRSs of each piece of paired UE are at the same positions at port 7, port 8, port 11 and port 13 and at the same positions at port 9, port 10, port 12 and port 14. In addition, values of a pilot reconfiguration factor χ and a data reconfiguration factor δ are shown in Table 2.

TABLE 2

| Layer number of each piece of UE | δ | χ |
|---|---|---|
| Port 7~port 9 Three layers of data streams | ⅓M | ⅔M |
| Port 7~port 10 Four layers of data streams | ¼M | ½M |
| Port 7~port 11 Five layers of data streams | ⅕M | ⅖M |
| Port 7~port 12 Six layers of data streams | ⅙M | ⅓M |
| Port 7~port 13 Seven layers of data streams | 1/7M | 2/7M |
| Port 7~port 14 Eight layers of data streams | ⅛M | ¼M |

Step 503: a beamforming weight is jointly generated according to the channel estimation matrix of each piece of paired UE.

Specifically, a channel estimation matrix H of the whole system is jointly constructed by the channel estimation matrices of the paired UE. An MU-MIMO precoding algorithm weight W of the channel estimation matrix of the whole system is calculated. Here, the precoding algorithm weight W is the beamforming weight W, and the beamforming weight W is calculated by virtue of a ZF algorithm or an MMSE algorithm.

The ZF algorithm:

an inverse or pseudo-inverse matrix of the channel estimation matrix is calculated as the beamforming weight according to $W=H^+=H^H(HH^H)^{-1}$.

The MMSE algorithm:

the beamforming weight is calculated according to $W=H^H(HH^H+\partial I)^{-1}$, where $\partial$ is a noise-to-signal ratio.

When the ZF algorithm is adopted, if noise of channels is loud, the noise may be amplified to weaken some useful signals to influence system performance after the beamforming weight is added. Therefore, the MMSE algorithm is adopted to reserve some residual noise and reduce weakening of the useful signals to minimize a mean square error between received signals and sent signals to effectively solve the problem of louder noise of the channels.

Step 504: power normalization is performed to obtain a precoding matrix.

Unified normalization is performed on power of each element of the precoding matrix by virtue of a formula, the formula being specifically:

$$W' = \frac{W}{\sum_{k=1,l=1}^{k=K,l=L} W^{k,l}} = \frac{W}{\|W\|^2}$$

where $W^{k,l}$ is a parameter corresponding to the kth row and first column of matrix W; K is the number of the antennae of the NodeB side; and L=MN, and is the total number of data receiving antennae of all the paired UE.

Step 505: beamforming and resource mapping are performed on the DMRSs and data of each piece of paired UE to generate data to be sent, and the data is sent.

Specifically, after the beamforming weight W is obtained, precoding operation may be performed on the DMRSs and data of the paired UE according to W, signals of an antenna domain are converted into signals of a beam domain for processing to implement beamforming, and pilots and data sent to multiple pieces of UE on each layer of data stream are accumulated on the same time-frequency resource to generate the data to be sent for simultaneous sending.

Embodiment 4

Figure 6:
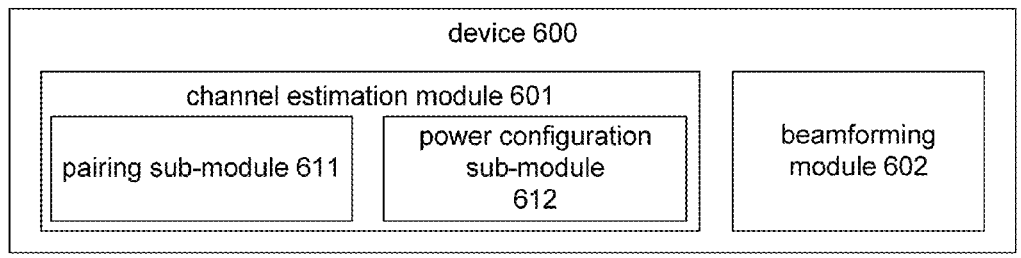
FIG. 6 is a structure diagram of a device for implementing transparent MU-MIMO transmission according to embodiment 4 of the disclosure.

Embodiment 4 of the disclosure provides a device 600 for implementing transparent MU-MIMO transmission, and as shown in FIG. 6, the device 600 includes: a channel estimation module 601 and a beamforming module 602, wherein the channel estimation module 601 is configured to pair at least two pieces of UE according to channel estimation matrices of UE, configure power of DMRSs of each piece of paired UE, and configure power of data of each piece of paired UE; and the beamforming module 602 is configured to jointly generate a beamforming weight according to the channel estimation matrix of each piece of paired UE, and perform beamforming according to the power of the DMRSs, the power of the data and the beamforming weight to generate a signal to be sent.

The channel estimation module 601 includes: a pairing sub-module 611 and a power configuration sub-module 612, wherein the pairing sub-module 611 is configured to pair the at least two pieces of UE according to the channel estimation matrices of the UE; and the power configuration sub-module 612 is configured to determine total power of each RE occupied by the DMRSs according to power of each RE occupied by a CRS, and further determine, according to a pilot reconfiguration factor, power of DMRSs that are allocated to each piece of paired UE.

The power configuration sub-module 612 is further configured to determine total power of each RE occupied by the data according to the power of each RE occupied by the CRS, and further determine, according to a data reconfiguration factor, power of data that is allocated to each piece of paired UE.

The beamforming module 602 is further configured to calculate a corrected beamforming weight according to the beamforming weight, and perform beamforming to generate the signal to be sent according to the power of the DMRSs, the power of the data and the corrected beamforming weight;

specifically, methods for the beamforming module 602 to calculate the corrected beamforming weight according to the beamforming weight include the following two:

1): normalization: the beamforming weight is normalized to obtain the corrected beamforming weight;

the beamforming weight is normalized to obtain the corrected beamforming weight according to $$W' = \frac{W}{\sum_{k=1,l=1}^{k=K,l=L} W^{k,l}} = \frac{W}{\|W\|^2},$$

where W is the beamforming weight, W' is the corrected beamforming weight, $W^{k,l}$ is a parameter corresponding to the kth row and first column of matrix W, K is the number of antennae of a NodeB side, L=MN, and is the total number of data receiving antennae of all the paired UE, M is the number of the paired UE, and N is the number of layers of data streams of the paired UE;

2): linear scaling: the beamforming weight is linearly scaled by virtue of a linear factor $$\frac{1}{\sqrt{MN}}$$

to obtain the corrected beamforming weight; and the beamforming weight is linearly scaled to obtain the corrected beamforming weight according to $$W' = \frac{W}{\sqrt{MN}}.$$

Figure 7:
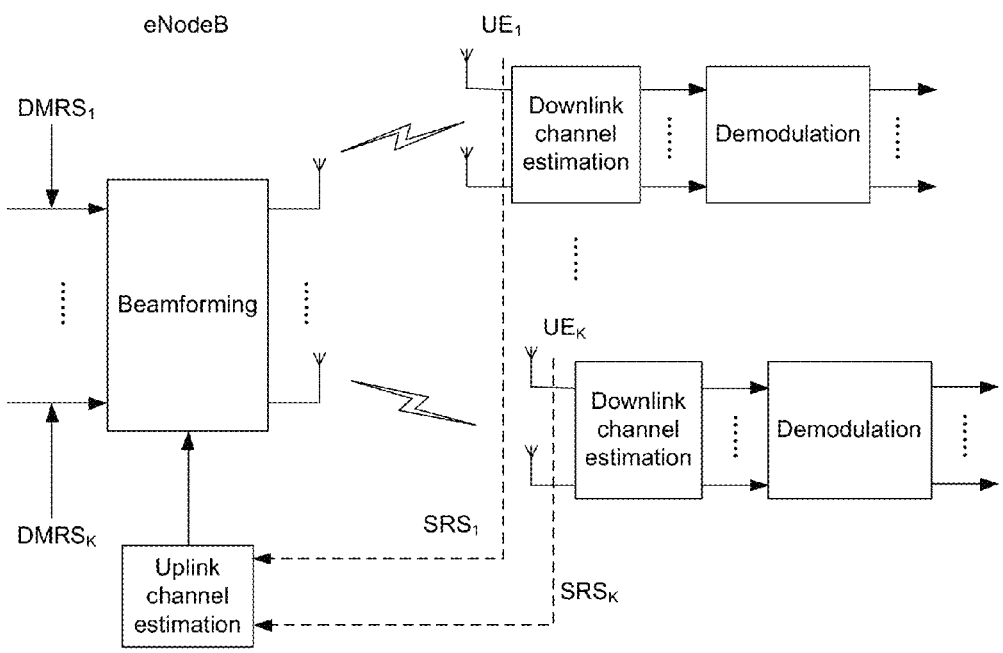
FIG. 7 is a diagram of a method for implementing MU-MIMO transmission according to a specific application example.

During a practical application, as shown in FIG. 7, on a signal sending side, a NodeB pairs K pieces of UE, DMRSs of each piece of paired UE being $DMRS_1$, $DMRS_2$, ... and $DMRS_K$ respectively, a beamforming weight is calculated according to corresponding channel estimation matrix of each piece of paired UE, beamforming is performed, a generated signal to be sent is sent through multiple antennae of the NodeB, and is simultaneously sent to the K pieces of UE; on a signal receiving side, $UE_1$, $UE_2$, ... and $UE_K$ demodulate the received signal according to different DMRSs, thereby distinguishing different paired UE, and the paired UE identifies the corresponding received signal, wherein acquisition of the channel estimation matrices includes that: the NodeB side performs channel estimation on $SRS_j$ sent by all the paired UE by virtue of downlink channel estimation, and then acquires channel estimation matrix $H_j$ of each piece of UE by virtue of uplink channel estimation, wherein j represents the jth UE, so that streaming data of multiple layers corresponding to multiple code words may be simultaneously sent to multiple pieces of paired UE in a transparent manner by optimizing a system structure and precoding method of the NodeB side on the premise of not changing protocols, not changing signalling flows and not changing receiving and demodulation flows of the UE, system throughput is obviously increased and decreased, and a system spectrum resource utilization rate is increased.

During a practical application, the device provided by the disclosure may serve as an independent system, and logical units for realizing different functions may also be added to existing network element equipment such as a NodeB.

When logical units are added to a NodeB, the channel estimation module 601, the pairing sub-module 611, the power configuration sub-module 612 and the beamforming module 602 may be implemented by a CPU, DSP or FPGA in the NodeB.

The above is only the preferred embodiment of the disclosure and not intended to limit the scope of protection of the disclosure.

INDUSTRIAL APPLICABILITY

According to the method and device for implementing transparent MU-MIMO transmission in the embodiment of the disclosure, the at least two pieces of UE are paired according to the channel estimation matrices of the UE, the power of the DMRSs of each piece of paired UE is configured, and the power of the data of each piece of paired UE is configured; and the beamforming weight is jointly generated according to the channel estimation matrix of each piece of paired UE, and beamforming is performed to generate the signal to be sent according to the power of the DMRSs, the power of the data and the beamforming weight, so that streaming data of multiple layers corresponding to multiple code words may be simultaneously sent to multiple pieces of paired UE in a transparent manner by optimizing a system structure and precoding method of a NodeB side on the premise of not changing protocols, not changing signalling flows and not changing receiving and demodulation flows of the UE, system throughput is obviously increased and decreased, and a system spectrum resource utilization rate is increased.

What is claimed is:

1. A method for implementing transparent Multi-User Multiple-Input Multiple-Output (MU-MIMO) transmission, comprising:
   pairing at least two pieces of User Equipment (UE) according to channel estimation matrices of UE, determining power of DeModulation Reference Signals (DMRSs) of each piece of paired UE, and determining power of data of each piece of paired UE; and
   jointly generating a beamforming weight according to a channel estimation matrix of each piece of paired UE, and performing beamforming according to the power of the DMRSs, the power of the data and the beamforming weight to generate a signal to be sent.

2. The method according to claim 1, wherein determining the power of the DMRSs of each piece of paired UE comprises:
   determining total power of each Resource Element (RE) occupied by the DMRSs according to power of each RE occupied by a Cell Reference Signal (CRS), and
   further determining, according to a pilot reconfiguration factor, power of DMRSs that are allocated to each piece of paired UE.

3. The method according to claim 1, wherein determining the power of the data of each piece of paired UE comprises:
   determining total power of each Resource Element (RE) occupied by the data according to the power of each RE occupied by a Cell Reference Signal (CRS), and
   further determining, according to a data reconfiguration factor, power of data that is allocated to each piece of paired UE.

4. The method according to claim 1, wherein jointly generating the beamforming weight according to the channel estimation matrix of each piece of paired UE comprises:
   obtaining a corrected beamforming weight according to the beamforming weight; and
   wherein beamforming is performed according to the power of the DMRSs, the power of the data and the corrected beamforming weight to generate the signal to be sent.

5. The method according to claim 4, wherein obtaining the corrected beamforming weight according to the beamforming weight comprises: normalizing the beamforming weight to obtain the corrected beamforming weight.

6. The method according to claim 4, wherein obtaining the corrected beamforming weight according to the beamforming weight comprises: linearly scaling the beamforming weight by virtue of a linear factor to obtain the corrected beamforming weight.

7. A device for implementing transparent Multi-User Multiple-Input Multiple-Output (MU-MIMO) transmission, comprising: a channel estimation module and a beamforming module, wherein the channel estimation module is configured to pair at least two pieces of User Equipment (UE) according to channel estimation matrices of UE, determine power of DeModulation Reference Signals (DMRSs) of each piece of paired UE, and determine power of data of each piece of paired UE; and the beamforming module is configured to jointly generate a beamforming weight according to a channel estimation matrix of each piece of paired UE, and perform beamforming according to the power of the DMRSs, the power of the data and the beamforming weight to generate a signal to be sent.

8. The device according to claim 7, wherein the channel estimation module comprises: a pairing sub-module and a power configuration sub-module, wherein the pairing sub-module is configured to pair the at least two pieces of UE according to the channel estimation matrices of the UE; and the power configuration sub-module is configured to determine total power of each Resource Element (RE) occupied by the DMRSs according to power of each RE occupied by a Cell Reference Signal (CRS), and further determine, according to a pilot reconfiguration factor, power of the DMRSs that are allocated to each piece of paired UE.

9. The device according to claim 7, wherein the power configuration sub-module is configured to determine total power of each Resource Element (RE) occupied by the data according to the power of each RE occupied by a Cell Reference Signal (CRS), and further determine, according to a data reconfiguration factor, the power of the data that is allocated to each piece of paired UE.

10. The device according to claim 7, wherein the beamforming module is further configured to calculate a corrected beamforming weight according to the beamforming weight, and perform beamforming according to the power of the DMRSs, the power of the data and the corrected beamforming weight to generate the signal to be sent.

11. The device according to claim 10, wherein the beamforming module is further configured to normalize the beamforming weight to obtain the corrected beamforming weight.

12. The device according to claim 10, wherein the beamforming module is further configured to linearly scale the beamforming weight by virtue of a linear factor to obtain the corrected beamforming weight.

* * * * *